(12) United States Patent
Fudge

(10) Patent No.: US 7,962,960 B2
(45) Date of Patent: Jun. 14, 2011

(54) SYSTEMS AND METHODS FOR PERFORMING RISK ANALYSIS

(75) Inventor: Robert T. Fudge, Quinlan, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1232 days.

(21) Appl. No.: 11/252,830

(22) Filed: Oct. 19, 2005

(65) Prior Publication Data

US 2006/0195905 A1    Aug. 31, 2006

Related U.S. Application Data

(60) Provisional application No. 60/655,911, filed on Feb. 25, 2005.

(51) Int. Cl.
*G06F 21/00*    (2006.01)
(52) U.S. Cl. ........................................................ 726/25
(58) Field of Classification Search .................. 713/182; 726/25
See application file for complete search history.

(56) References Cited

U.S. PATENT DOCUMENTS

| 5,850,516 | A | * | 12/1998 | Schneier | 726/25 |
| 2005/0044418 | A1 | * | 2/2005 | Miliefsky | 713/201 |
| 2005/0171822 | A1 | * | 8/2005 | Cagan | 705/7 |
| 2005/0193430 | A1 | * | 9/2005 | Cohen et al. | 726/25 |
| 2007/0192867 | A1 | * | 8/2007 | Miliefsky | 726/25 |

OTHER PUBLICATIONS

Relex, "Relex Fault Tree/Event Tree", Mar. 18, 2003. Downloaded Apr. 15, 2010. Available at http://web.archive.org/web/20030318034430/http://www.relexsoftware.com/products/ftaeta.asp.*

* cited by examiner

*Primary Examiner* — Nasser Moazzami
*Assistant Examiner* — Travis Pogmore

(57) ABSTRACT

A method for analyzing a network element may include assigning values to each of a plurality of vulnerabilities. The method may also include identifying a vulnerability associated with the network element and generating a risk indicator for the network element based on the assigned value associated with the identified vulnerability.

23 Claims, 6 Drawing Sheets

SYSTEMS AND METHODS FOR PERFORMING RISK ANALYSIS

RELATED APPLICATION

This application claims priority under 35 U.S.C. §119 based on U.S. Provisional Application No. 60/655,911 filed Feb. 25, 2005, the disclosure of which is hereby incorporated herein by reference.

FIELD OF THE INVENTION

Implementations consistent with the invention relate generally to networks and, more particularly, to analyzing networks and network devices for vulnerabilities.

BACKGROUND OF THE INVENTION

Networks and network devices are often attacked by various parties. For example, an attacker may attack a company's network to try to obtain company private information or obtain personal information on individuals, such as credit card information or account number information associated with the company's customers or employees. Alternatively, an attacker may try to overload a network's capacity to attempt to shut down a company's web server or network. As a result, companies are spending more time and money analyzing their networks to attempt to identify vulnerabilities of their networks.

One problem with attempting to identify network vulnerabilities is that it is often a very time consuming process. For example, a network engineer or other party typically must analyze each network device individually to identify a most likely attack point. The network engineer may then report the identified vulnerability to another party in the company who may be responsible for taking action to mitigate the risk of attack. Such a process is particularly time consuming and costly.

In addition, when a network is dynamically changing, it becomes even more difficult to identify vulnerabilities in the network. For example, when new network devices are added to the network, tracking the new network devices, identifying parties responsible for assessing the vulnerabilities associated with the new devices and reducing the potential risk associated with the vulnerabilities becomes even more time consuming and costly.

SUMMARY OF THE INVENTION

According to one aspect, a method for analyzing a network element includes assigning values to each of a plurality of vulnerabilities. The method also includes identifying at least one vulnerability associated with the network element. The method further includes generating a risk indicator for the network element based on an assigned value associated with the identified vulnerability.

According to another aspect, a method includes providing an interface to a user device, where the interface including options associated with monitoring network devices. The method also includes receiving an input from the user device, identifying at least one network element in response to the input and generating a risk indicator associated with the network device, where the risk indicator represents a relative risk associated with the network device. The method further includes providing the risk indicator to the user device.

A further aspect provides a system that includes a memory configured to store values associated with a plurality of network-related vulnerabilities. The system also includes a processing device configured to receive information corresponding to identified vulnerabilities associated with a first network device. The processing device is further configured to access the memory to determine values associated with the identified vulnerabilities and generate a risk level indicator for the first network device based on values associated with the identified vulnerabilities.

BRIEF DESCRIPTION OF THE DRAWINGS

Reference is made to the attached drawings, wherein elements having the same reference number designation may represent like elements throughout.

DETAILED DESCRIPTION

Figure 1:
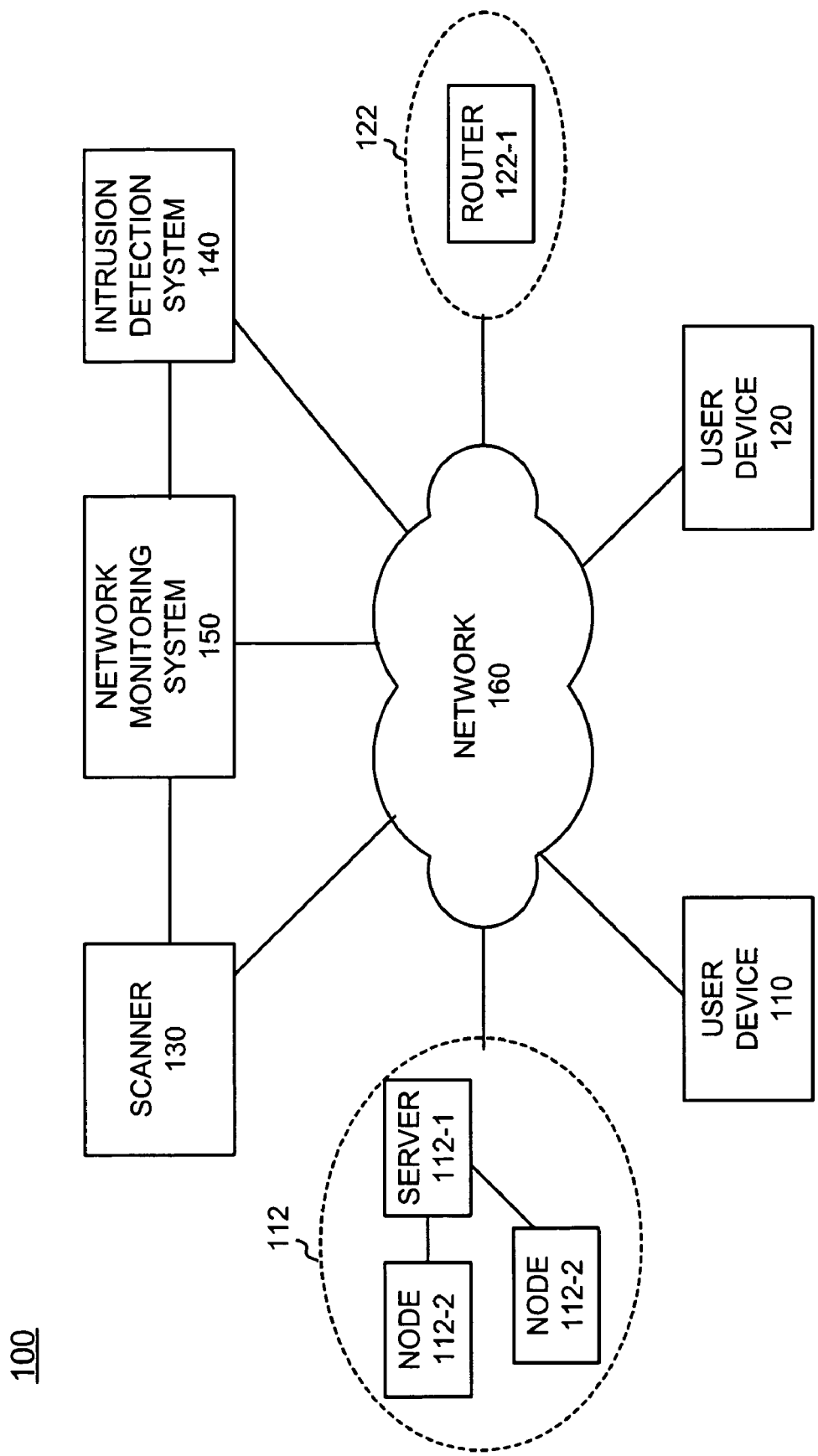
FIG. 1 is a block diagram of an exemplary system in which methods and systems consistent with the invention may be implemented.

FIG. 1 is a block diagram of an exemplary system 100 in which methods and systems consistent with the invention may be implemented. System 100 includes user devices 110 and 120, domains 112 and 122, scanner 130, intrusion detection system 140, network monitoring system 150 and network 160. The exemplary configuration illustrated in FIG. 1 is provided for simplicity. It should be understood that a typical system may include more or fewer devices than illustrated in FIG. 1.

User devices 110 and 120 may each include a computing device, such as a server, a personal computer (PC), a laptop computer, a personal digital assistant (PDA), a web-based appliance or a similar device that is able to transmit and receive data via a network, such as network 160. In an exemplary implementation, each of user devices 110 and 120 may be associated with one or more domains of network devices (e.g., domains 112 and 122) and may be used to initiate a vulnerability assessment procedure, as described in more detail below.

Domains 112 and 122, illustrated in FIG. 1 by the dashed ovals, may each include a number of network devices. For example, domains 112 and 122 may each include one or more servers, nodes, routers, switches, etc., that may be included in a typical network. Domains 112 and 122 may also include software programs and/or network interfaces provided by or executed by one of the network devices within domains 112 and 122, respectively. For example, referring to FIG. 1, domain 112 may include a server 112-1 and a number of nodes 112-2 coupled to server 112-1 via a network, such as a local area network (not shown). Nodes 112-2 may represent users in a department/group within a company or organization that access server 112-1 for various services. Nodes 112-2 may also represent users outside a company that may access server 112-1. In each case, server 112-1 may run programs accessible to each of the users represented by nodes 112-2. Domain 122 may include, for example, router 122-1, as illustrated in FIG. 1. Domain 122 may also include a number of other devices, such as switches, network interface devices, etc. (not shown). It should be understood that the number of network devices illustrated in domains 112 and 122 is provided for simplicity and typical domains may include more or fewer devices than illustrated in FIG. 1.

As described above, in an exemplary implementation, each of user devices 110 and 120 may be affiliated with one or more domains in system 100. For example, user device 110 may be affiliated with domain 112 and user device 120 may be affiliated with domain 122. In this case, a party associated with user device 110 may be responsible for assessing vulnerabilities in domain 112 and a party associated with user device 120 may be responsible for assessing vulnerabilities associated with domain 122.

Scanner 130 may include one or more scanners used to detect anomalies in network devices. For example, scanner 130 may include a device that scans a server for open ports that may be infiltrated by a hacker. Intrusion detection system (IDS) 140 may include one or more IDSs that detect attacks on devices, such as a particular server, switch, router, etc. For example, IDS 140 may monitor and track traffic being sent to various devices, such as router 122-1, in order to determine whether an attacker is attempting to overload a particular network device or inject a virus into system 100. Additional details of scanner 130 and IDS 140 are not provided herein in order to not unduly obscure the thrust of the invention. Such devices, however, would be known to one of ordinary skill in the art.

Network monitoring system 150 may include one or more computing devices/platforms associated with monitoring network devices in system 100. For example, network monitoring system 150 may be responsible for performing a risk analysis associated with devices in system 100. In this case, network monitoring system 150 may provide a user interface to user devices (e.g., user devices 110 and 120) to allow the user devices to initiate a monitoring operation of device(s) in system 100. Network monitoring system 150 may also receive data from scanner 130 and IDS 140 that facilitate the identification of potential vulnerabilities in system 100 (e.g., devices in domain 112 and/or 122). In alternative implementations, the functions performed by scanner 130 and/or IDS 140 may be performed by network monitoring system 150. In each case, network monitoring system 150 may perform a risk assessment and provide the risk assessment information to the particular user device.

Network 160 may include one or more wired, wireless and/or optical networks that are capable of receiving and transmitting data and/or voice signals. For example, network 160 may include one or more public switched telephone networks (PSTNs) or other type of switched network. Network 160 may also include packet switched networks, such as the Internet, an intranet, a local area network (LAN), a wide area network (WAN), or another type of network that is capable of transmitting data from a source device to a destination device. Network 160 may include a variety of network devices, including routers, switches, etc., that aid in the transmission and reception of data in system 100. Each of these devices (not shown) may be affiliated with a particular domain in system 100 and may be monitored by network monitoring system 150.

One or more attackers (not shown) may attempt to attack a network element in system 100. For example, an attacker may attempt to hack into a server or computing device in one of domains 112 and 122 via network 160 or launch an attack by transmitting packets to one of the servers or computing devices. Network monitoring system 150 may be used to identify potential vulnerabilities for such attacks in system 100, as described in more detail below.

Figure 2:
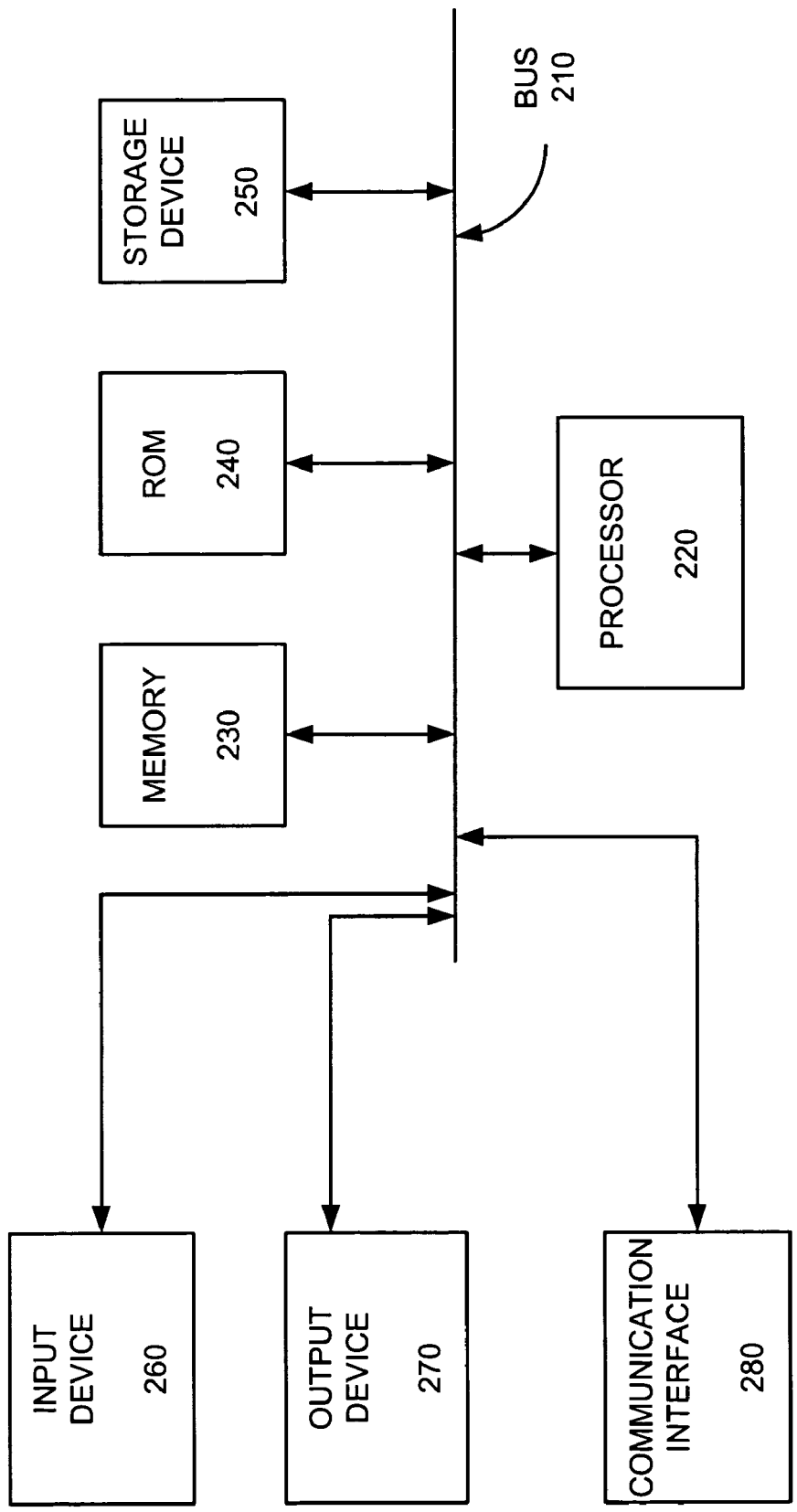
FIG. 2 is an exemplary block diagram of the network monitoring system of FIG. 1.

FIG. 2 illustrates an exemplary configuration of network monitoring system 150 in an implementation consistent with the invention. Network monitoring system 150 may include a bus 210, a processor 220, a memory 230, a read only memory (ROM) 240, a storage device 250, an input device 260, an output device 270, and a communication interface 280. Bus 210 permits communication among the components of network monitoring system 150.

Processor 220 may include any type of processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a conventional ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional mechanisms that permit an operator to input information to network monitoring system 150, such as a keyboard, a mouse, a pen, voice recognition and/or biometric mechanisms, etc. Output device 270 may include one or more conventional mechanisms that output information to the operator, including a display, a printer, one or more speakers, etc. Communication interface 280 may include any transceiver-like mechanism that enables network monitoring system 150 to communicate with other devices and/or systems. For example, communication interface 280 may include a modem or an Ethernet interface to a LAN. Alternatively, communication interface 280 may include other mechanisms for communicating via a network.

Network monitoring system 150, consistent with the invention, performs a risk analysis associated with network elements in response to processor 220 executing sequences of instructions contained in a computer readable medium, such as memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement the invention. Thus, the invention is not limited to any specific combination of hardware circuitry and software.

Figure 3:
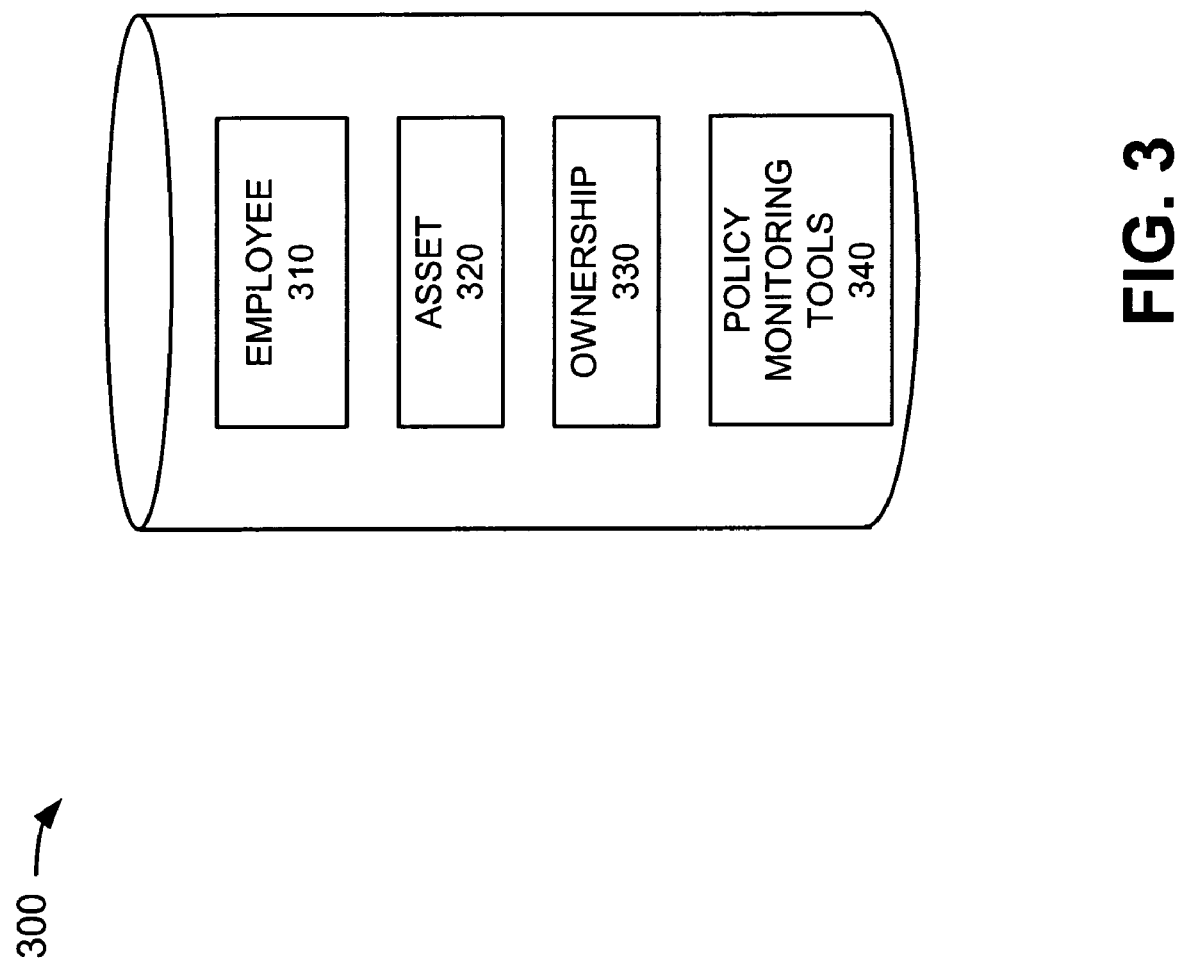
FIG. 3 illustrates exemplary databases that may be used by the network monitoring system of FIG. 1.

FIG. 3 illustrates a number of databases 300 that may be used in an exemplary implementation of the invention. Databases 300 may include employee database 310, asset database 320, ownership database 330 and policy monitoring tools database 340. Databases 300 may be stored on, for example, storage device 250 (FIG. 2) or on any other computer-readable medium that is accessible by network monitoring system 150.

Employee database 310 may include information identifying employees within a company and their corresponding access level. For example, in one implementation, an employee may only have access to monitor network elements/devices for which he/she is directly responsible. In other implementations, an employee may be able to access network information based on his/her level within the company. For example, a manager may be able to access network information for all the network devices associated with a department that he/she manages. In each case, employee database 310 stores information that may be used by network monitoring system 150 to determine whether a particular employee has access to particular information. Employee database 310 may also be periodically updated to maintain accuracy with respect to current employees and their corresponding access levels.

Asset database 320 may include inventory information identifying network devices/assets in system 100. For example, asset database 320 may store information identifying network elements, network interfaces, programs and other hardware or software in system 100 for which network monitoring system 150 is responsible. When devices or programs are added to system 100, asset database 320 may be updated to reflect the new devices and/or software. Asset database 320 may be used by network monitoring system 150 when a scan of elements in system 100 is performed. For example, network monitoring system 150 may compare the output of a scan of system 100 to asset database 320 to determine whether all the network devices identified by the scan are accounted for and match information stored in asset database 320.

Ownership database 330 may include information identifying an "owner" or responsible party associated with, for example, a domain, such as domain 112 or 122. The ownership data may include, for example, information identifying a network engineer responsible for managing a router, a server, an internal LAN/WAN, etc. The ownership data may also include information identifying a party that has applied for a new Internet protocol (IP) address and the device(s) associated with the new IP address, such as one or more servers, routers, switches, nodes, etc. Ownership database 330 may also be periodically updated to maintain accuracy with respect to current ownership information.

Policy monitoring tools database 340 may store information identifying particular policies associated with network elements in system 100. For example, policy monitoring tools database 340 may store particular policies applicable to server(s) or router(s) in system 100. In one implementation, policy monitoring tools database 340 may store minimum security baseline (MSB) rules associated with devices in system 100. MSB rules may identify various minimum security policies or rules associated with devices in system 100. Policy monitoring tools database 340 may also store violation information associated with the particular network elements. For example, policy monitoring tools database 340 may store information indicating that various devices in system 100 are in violation of MSB rules and a date/time on which the MSB rules violation was detected.

Policy monitoring tools database 340 may also store "exception" information identifying both business and technical exceptions associated with various network devices. For example, if an administrator wishes to run a program or service on a particular network element, such as a service that is not generally approved for that network element, the administrator may get approval from a manager to run this program/service. Once approval is given, the exception information may be stored in policy monitoring tools database 340. In this manner, network monitoring system 150 may be aware of particular business exceptions that may affect the type of data that a network element is likely to receive.

Another example of exception information may involve a technical exception. For example, scanner 130 may run a scan for a network device with which it is unable to communicate. That is, the network device being scanned may run an operating system that is not compatible with scanner 130 or scanner 130 may be unable to communicate with the network device for other reasons. In this case, policy monitoring tools database 340 and/or asset database 320 may store information indicating that scan data resulting from a scan of such a device will be meaningless or erroneous. The exception information may be used by network monitoring system 150 when analyzing risk associated with a network element, as described in more detail below.

In the exemplary implementation illustrated in FIG. 3, databases 310-340 are shown as separate databases. In alternative implementations, databases 310-340 may be implemented as a single database. It should also be appreciated that the information in databases 310-340 may be stored using a data structure that includes multiple links between the individual databases so that the information in one of these databases may be linked to information in one of the other databases to facilitate efficient use of the information stored in databases 310-340.

Exemplary Processing

Figure 4:
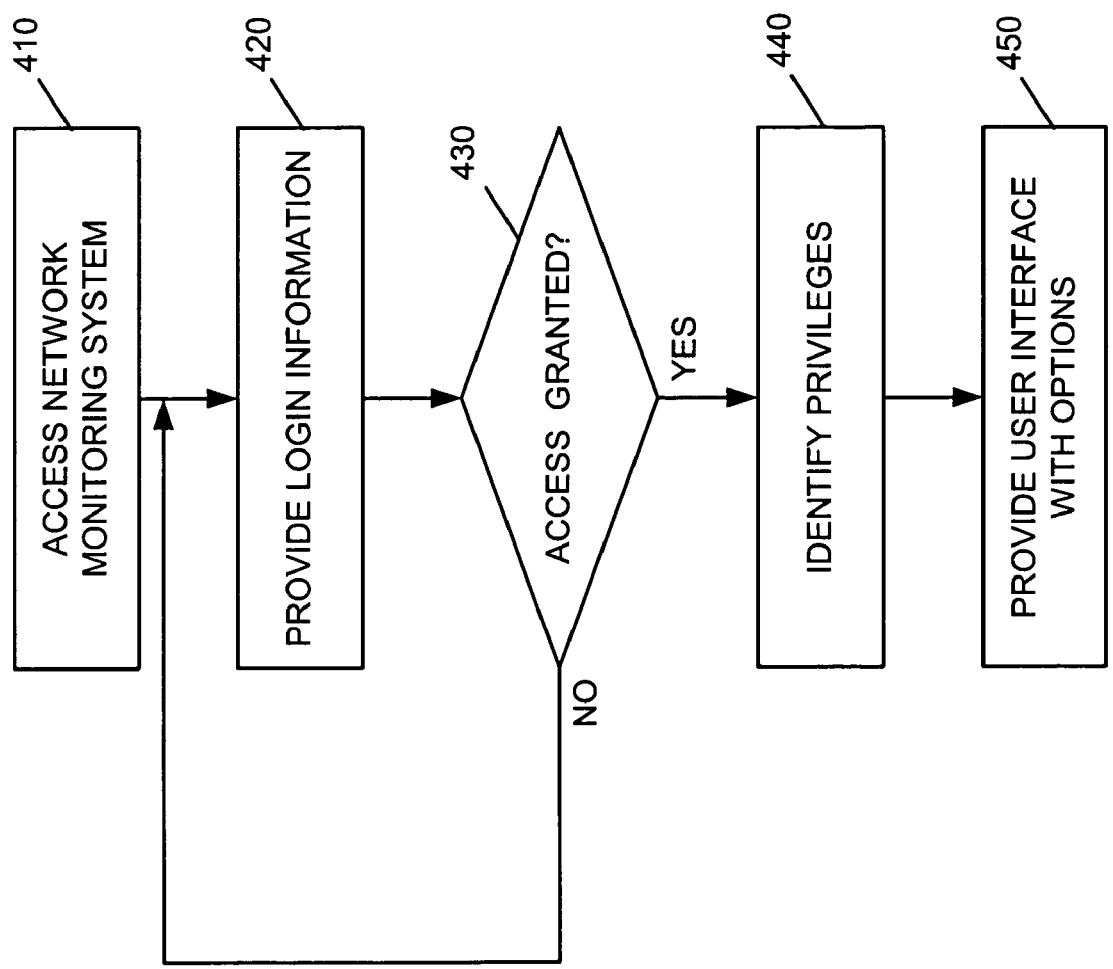
FIG. 4 is a flow diagram illustrating exemplary processing associated with accessing the network monitoring system of FIG. 1.

FIG. 4 is a flow diagram illustrating exemplary processing associated with accessing network monitoring system 150. Processing may begin by a party at a user device, such as user device 110, accessing network monitoring system 150 (act 410). Network monitoring system 150 may require the party to enter login information, such as a user name and/or password.

Assume that the party at user device 110 enters the requested login information (act 420). Network monitoring system 150 may then determine whether the user name and password are valid to determine whether to grant access to network monitoring system 150 (act 430). If the login information is not valid, access is denied and a message may be provided to the party at user device 110 indicating that the login information provided was not valid. Processing may then return to act 420.

If the login information is valid, network monitoring system 150 may then identify the party's access privileges (act 440). For example, as described above, employee database 310 may store information on each employee and their corresponding access level with respect to network monitoring system 150 and information associated with system 100. That is, a particular employee may only have access to information regarding a portion of network devices in system 100.

Assume that the party at user device 110 has access privileges associated with information for network devices in domain 112. In this case, network monitoring system 150 may provide a user interface to user device 110 that displays available options associated with monitoring devices/elements in domain 112 (act 450).

For example, in the example in which the party at user device 110 has access privileges associated with domain 112, network monitoring system 150 may provide a list of options associated with monitoring server 112-1 and nodes 112-2. These options may include an option to run a search utility to search/scan a particular network element, such as server 112-1. In addition, the options may include an option to run a search utility on nodes 112-2. In each case, the options may be designed based on the particular access privileges for the party accessing network monitoring system 150.

In some implementations, the options provided at act 450 may include an option to delegate rights associated with monitoring/maintaining security for one or more network devices to another party for a designated period of time. Another option may allow one party (e.g., at user device 110) to designate another party (e.g., at user device 120) the option to view rights associated with particular devices (e.g., to view what parties have monitoring/maintaining responsibility for various domains, devices, etc).

The options provided at act 450 may further include an option to import network scan information into, for example, a program running on user device 110. This may help the party at user device 110 be able to recall information regarding a network scan at a later time.

The options provided at act 450 may also include an option to create a remediation log associated with actions taken to fix potential vulnerabilities. In other words, this option may allow the party at user device 110 to document action taken to mitigate vulnerabilities identified by a network scan.

Still other options provided at act 450 may allow a party to create or modify exceptions on particular devices and to view or search exceptions associated with particular devices. For example, one exception may allow a particular network device, such as a server, to run a particular program or allow access to the server from users outside a company. Another exception may permit a network device to violate an MSB rule. The exceptions may be stored, for example, in policy monitoring tools database 340. Creating, modifying and viewing exceptions via network monitoring system 150 increases the flexibility of monitoring system 150 without requiring time consuming telephone calls, e-mail communication, etc., between various parties that may be involved in providing security for system 100. For example, a manager responsible for a particular device may create or modify an exception directly via network monitoring system 150 without having to communicate with a number of other parties in the company.

The options provided at act 450 may further allow one party to be granted another party's access privileges. This may be beneficial, for example, when a particular party is going to be unavailable for a period of time and wishes to delegate his/her responsibility with respect to system 100 to another party.

In summary, the user interface provided by network monitoring system 150 provides users a variety of options via an easy-to-use interface. The options, as described above, are tailored to a user's particular access privileges, thereby increasing security associated with use of network monitoring system 150. That is, the user interface ensures that users are not able to access or modify information outside of their authorized areas. In addition, the user friendly interface facilitates use of network monitoring system 150 by parties that may be relatively infrequent users. Once a party, such as a party at user device 110, has been provided with the user interface at act 450, the party may initiate a risk analysis process, as described in more detail below.

Figure 5:
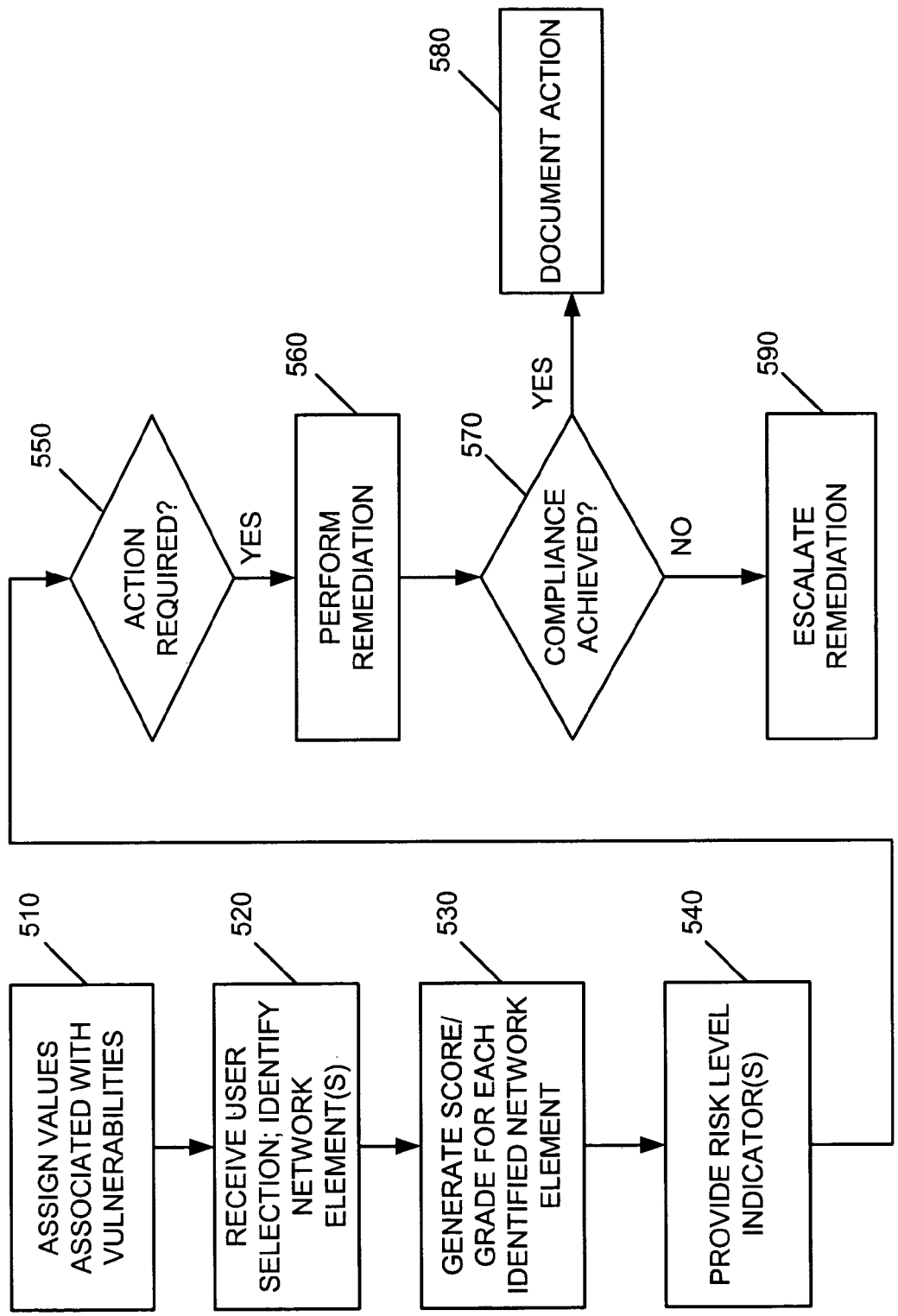
FIG. 5 is a flow diagram illustrating exemplary processing associated with performing a risk analysis procedure in one implementation.

FIG. 5 is an exemplary flow diagram illustrating processing associated with performing a risk analysis procedure via network monitoring system 150. Processing may begin by assigning numerical values associated with particular vulnerabilities in system 100 (act 510). For example, personnel associated with network operating system 150 may generate a list of potential vulnerabilities within system 100, such as vulnerabilities associated with network elements included in domains 112 and 122 and network 160, that may pose a likely risk to attack from, for example, a hacker. Such risks may include open ports within a network element (e.g., ports that can be seen from outside a company's internal network and through which access can be gained by an outside device), network elements that interface with non-secured devices, network elements that have not been scanned to identify potential open ports, network elements that have no intrusion detection system, firewall, or other protection systems installed, etc. Personnel associated with network operating system 150 (e.g., network engineers, administrators, etc.) may assign the numerical values to each potential vulnerability, based on, for example, the likelihood that the vulnerability can be exploited.

For example, in one implementation, each open port within a network element may be assigned a value of 1. In addition, each open port may further be assigned a value based on the level of vulnerability. For example, an open port with a "high" vulnerability may be assigned a value of 15, an open port with a "medium" vulnerability may be assigned a value of 5 and an open port with "low" vulnerability may be assigned a value of 3. The determination of high/medium/low may be based on any number of factors associated with the particular network element, such as the function of the network element. In addition, the particular values are exemplary only and any values could be assigned based on the particular network element and other factors known to the parties affiliated with network monitoring system 150.

For example, the numerical values may also be assigned based on the location of the particular network element. In an exemplary implementation, a network element that is located in a more sensitive area may be assigned a higher value than a network element that is located in a less important area. In one implementation, a network element located in a "demilitarized zone" (DMZ) (i.e., a location between an internal network and an external network, such as the Internet) and having an open port may be assigned a value of 100, a network element located in a secure network and having an open port may be assigned a value of 75, a network element not located in a secure communication room and having an open port may be assigned a value of 50 and a network element on a "Do Not Scan" list (i.e., the network element has not been scanned for vulnerabilities) and having an open port may be assigned a value of 750. It should be understood that these values are exemplary and other values may be assigned on the particular threat level.

In an exemplary implementation, if network monitoring system 150 detects that an attack (via, for example, IDS 140) destined for a particular network element is in progress, that attack may be assigned a very high value, such as a value of 1000. This very high value ensures that the attack is given the highest priority, as described in more detail below.

As described above, the particular values associated with vulnerabilities of network elements may be assigned by those most familiar with the company or organization with which network elements are affiliated. The values assigned may also be changed based on changes in the configuration of the company's network, addition of equipment, such as firewalls, etc. For example, if a firewall is added to a particular server, the score associated with an open port on that server may be reduced.

After a value has been assigned to each potential vulnerability associated with network elements in system 100, network monitoring system 150 may store this information in, for example, policy monitoring tools database 340. This information may then be used to generate a score or grade for each network element when a party requests information for this network element. It should also be understood that the values associated with vulnerabilities may be stored prior to a party accessing network monitoring system 150. These values may also be updated by the appropriate personnel at any time.

As described above, assume that the party at user device 110 has been provided with the user interface described above with respect to act 450. Further assume that the party at user device 110 inputs a selection for executing a risk analysis on elements in domain 112. Network monitoring system 150 receives the selection and identifies the network element(s) for which a risk assessment is to be performed (act 520). For example, in the implementation described above with respect to domain 112, network monitoring system 150 may identify server 112-1 and nodes 112-2.

Network monitoring system 150 may then generate a score for each of the identified network elements identified at act 520 (e.g., server 112-1 and nodes 112-2) (act 530). Network monitoring system 150 may obtain the score in a number of different ways. For example, network monitoring system 150 may signal the appropriate scanner(s), such as scanner 130, to perform a scan of server 112-1 and nodes 112-2. Scanner 130 may then remotely scan each of the ports of server 112-1 and nodes 112-2 to, for example, determine whether any open ports exist. Alternatively, the information regarding open ports, etc., may be pre-stored in, for example, policy monitoring tools database 340 as a result of periodic scans by scanner 130. In still other alternatives, the information regarding open ports, etc., may be input to network monitoring system 150 from, for example, a network engineer and/or administrator associated with the particular network element.

Network monitoring system 150 may also signal the appropriate IDS(s), such as IDS 140, to determine whether server 112-1 and/or nodes 112-2 have been or are currently the target of an attempted attack. That is, IDS 140 may identify traffic destined for domain 112 and determine whether any of the data represents an attempted attack on a network element in domain 112. Alternatively, the information regarding attacks on network elements may be pre-stored in, for example, policy monitoring tools database 340 as a result of periodic or continuous monitoring by IDS 140.

Network monitoring system 150 may receive the data from scanner 130, IDS 140 and/or other sources and correlate the information to generate the appropriate score or grade. As described previously, network monitoring system 150 may store information associated with locations of each network element, such as whether the network element is in a DMZ, in a secure communications room, etc., to facilitate generation of a score/grade for a network element. Network monitoring system 150 may then use this information as one of the factors affecting the score associated with a network element.

Network monitoring system 150 may further correlate the information received from scanner 130 and IDS 140 with the "exception" information when generating a score/grade for a network element. The exception information, as described above, may include both business and technical exceptions.

For example, if a scan shows that a program is being run on server 112-1, such as a program that is not generally approved for server 112-1, network monitoring system 150 may determine whether an exception has been granted for that program to be run on server 112-1. If an exception has been granted, network monitoring system 150 may reduce the score associated with this network element. In addition, network monitoring system 150 may check the exception information in policy monitoring tools database 340 to determine whether any other exceptions associated with, for example, other anomalies in the type/amount of data that server 112-1 is receiving to determine whether the anomaly is covered by an exception that has been approved for that network element. The exception, therefore, may account for the anomaly. In an exemplary implementation, if an exception has been approved for a particular network element, the score for that particular network element may be reduced by some value, such as 50.

As described above, another example of exception information may involve a technical exception. For example, assume that scanner 130 runs a scan on one of nodes 112-2 and the resulting scan data is meaningless or erroneous. Network monitoring system 150 may check policy monitoring tools database 340 to determine whether a business exception has been approved for node 112-2, such as information indicating that node 112-2 is using an operating system that is not compatible with scanner 130. If such an exception has been granted, network monitoring system 150 may reduce the score for node 112-2 by a predetermined amount, such as, for example, 50.

In addition, network monitoring system 150 may check ownership database 330 when generating the scoring. For example, if a particular network device does not have an "owner" registered in ownership database 330, the score for that network element may be increased by a predetermined amount.

After network monitoring system 150 has received the information from scanner 130 and IDS 140 and has correlated the received data with information stored in, for example, policy monitoring tools database 340, asset database 320 and/or ownership database 330, network monitoring system 150 may generate a score for each network element (i.e., server 112-1 and nodes 112-2 in this example). For example, the values associated with each of the identified vulnerabilities for server 112-1 may be added to generate an overall score. Similarly, the values associated with each of the identified vulnerabilities for each of nodes 112-2 may be added to generate an overall score for each of nodes 112-2. In this implementation, the higher score indicates a greater vulnerability. In this manner, the party at user device 110 may be able to easily prioritize the risk associated with network elements in domain 112 based on the scores.

In an alternative implementation, a grade or a pass/fail determination may be generated for each network element (e.g., server 112-1 and each of nodes 112-2). For example, in this implementation, each network element may be originally assigned a value of 100. Each identified vulnerability may then reduce the value for that network element. For example, if a network element has an open port, 0.5 may be subtracted from the 100. If the open port is a high vulnerability port, a value of 5 may be subtracted. Further, if a network element is on a Do Not Scan list, a value of 30 may be subtracted. The total score for each element may then be determined and a grade (e.g., a letter grade, such as A through F or a pass/fail grade) may be generated for each network element. The grades may make it easier for a manager who does not interface with network monitoring system 150 on a regular basis to more easily understand the status of each network element and provide a good overview of the risk associated with each network element. In still other alternatives, a risk level indicator for each network element, such as a high, medium or low indicator, may be generated based on the scores.

After scores, grades or some other relative risk indicator, (referred to collectively hereafter as risk level indicators) are generated for each identified network element in system 100, network monitoring system 150 may provide the risk level indicators to user device 110 (act 540). The risk level indicator may be an overall risk level indicator for domain 112 and/or a risk level indicator for each individual element in domain 112. The party at user device 110 may be a network administrator that analyzes the risk associated with the network elements and prioritize the risk based on the risk level indicator.

Network monitoring system 150 may also provide an option to allow the party at user device 110 to view details regarding the scoring/grading of devices in domain 112. In this case, network monitoring system 150 may allow the party at user device 110 to click on a link or input box to view particular details of the scoring used to generate the risk level indicator. This may allow the party at user device 110 to more clearly assess the risk.

In each case, the party at user device 110 may determine whether any actions are required (act 550). For example, in an exemplary implementation described above with respect to scoring each network element, the higher the score for a particular network element, the more likely that network element is vulnerable to an attack. For example, assume that server 112-1 has a score of 5 and each of nodes 112-2 has a score of 1. This may indicate that server 112-1 and nodes 112-2 pose little or no risk to being attacked. In this case, no action may be required with respect to domain 112 and processing with respect to this procedure may end. Assume, however, that server 112-1 received a score of 300. In this case, the party at user device 110 may determine that server 112-1 is very vulnerable to an attack and immediate action is required to mitigate this risk.

The party at user device 110 may then perform remediation actions to reduce the risk (act 560). For example, the party at user device 110 may send a troubleshooter to server 112-1 to take steps to reduce the vulnerability. In other cases, the party at user device 110 may be able to remotely make changes to server 112-1 via network 160 to reduce the risk.

In some implementations, network monitoring system 150 may send an alert to a console associated with another party (e.g., a network engineer) associated with maintaining security for server 112-1 indicating that a security problem exists. Alternatively, network monitoring system 150 may send an alert to a pager, PDA, cell phone, etc., of a party associated with maintaining security for server 112-1 or send an e-mail to that party. In addition, if the risk is high enough, network monitoring system 150 may take actions to automatically quarantine server 112-1 to limit or halt traffic to/from server 112-1. The particular remediation taken may be based on the particular network element and the particular company requirements. In some implementations consistent with the invention, network monitoring system 150 may automatically take actions to limit or prevent an attack based on pre-determined procedures. Alternatively, network monitoring system 150 may automatically send alerts to the appropriate personnel responsible for taking necessary remedial actions. Such actions may include preventing traffic from reaching the network element or limiting access to the highly vulnerable network element.

After remediation actions have been taken, the party at user device 110 and/or network monitoring system 150 may determine whether compliance has been achieved (act 570). For example, the party at user device 110 may initiate another monitoring procedure (e.g., a re-scan) on the network element for which remedial action has been taken. Network monitoring system 150 may then generate a new risk level indicator (e.g., score) for server 112-1. The party at user device 110 may then determine whether risk compliance has been achieved based on the new risk level indicator. For example, the party at user device 110 may determine whether the new score is now in an acceptable range, indicating that the vulnerability has been reduced to an acceptable risk level. Alternatively, network monitoring system 150 may automatically initiate a re-scan of high risk network devices a predetermined period of time after the high vulnerability has been detected. In either case, after the re-check has been completed and if compliance has been achieved, network monitoring system 150 may document the action(s) taken and record the new risk level indicator for that particular network element (act 580).

If compliance has not been achieved, the party at user device 110 or network monitoring system 150 may escalate the remediation (act 590). For example, the party at user device 110 and/or network monitoring system 150 may send alerts to personnel associated with the vulnerable network element indicating that a quarantine action should be performed with respect to the network element. Alternatively, in some implementations, network monitoring system 150 may automatically quarantine the vulnerable network element by, for example, shutting down the network element and/or preventing access to the network element by any outside traffic.

In another alternative implementation, if action is required at either act 550 or compliance has not been achieved at act 570, the party at user device 110 may request that an exception for the offending network device be granted. That is, if a particular network device is outside an acceptable risk range, but a party at user device 110 has determined that the network element does not pose a significant risk, the party at user device 110 may request that an exception be stored in policy monitoring tools database 340 that would account for the high risk level. In future scans, the exception information would then reduce any risk level indicator for that network element to an acceptable range.

In the manner describe above, a risk analysis associated with managing network elements in system 100 may be performed by generating relative risk level indicators for the particular network elements. The need for remedial actions with respect to network elements may then be prioritized based on the risk level indicators. Actions may then be taken based on the prioritization to reduce the vulnerability to attack associated with network elements posing the highest risk.

In some implementations, network monitoring system 150 may generate risk level indicators for various network elements during normal operation of the network elements in system 100. That is, network monitoring system 150 may generate the risk level indicators without direct input from a party at, for example, one of user devices 110 or 120.

Figure 6:
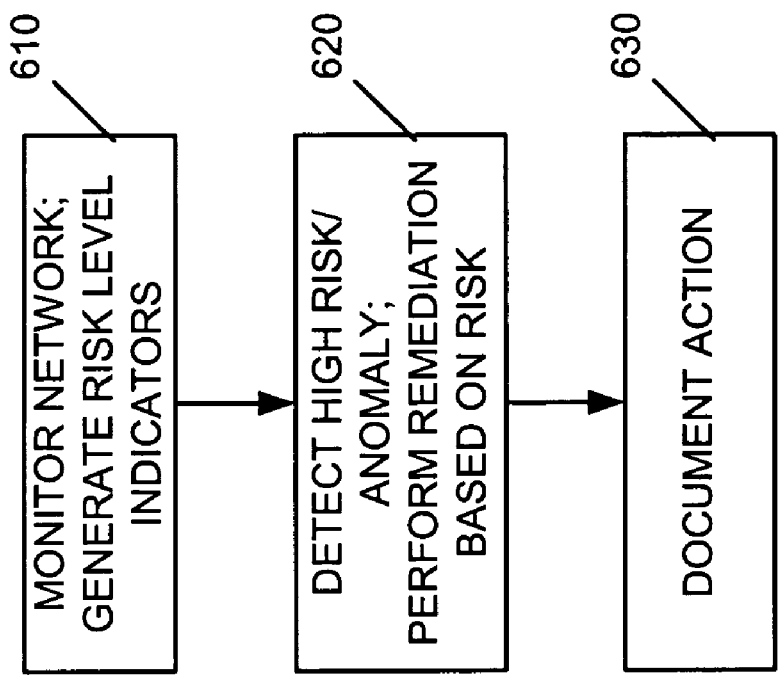
FIG. 6 is a flow diagram illustrating exemplary processing associated with the network monitoring system of FIG. 1 in accordance with another implementation.

FIG. 6 illustrates an exemplary process performed by network monitoring system 150 consistent with another implementation of the invention. In this implementation, scanner 130 and 140 may monitor the network elements in system 100 (act 610). For example, scanner 130 may periodically scan elements in domains 112 and 122. IDS 140 may also periodically, or continuously, monitor traffic to/from domains 112 and 122. In this case, IDS 140 may look at the destination information associated with data packets transmitted on network 160 and identify the destination of these packets. Scanner 130 and IDS 140 may provide a result of the scanning (e.g., whether any open ports exist) and monitoring (e.g., whether an attack is occurring) to network monitoring system 150.

Network monitoring system 150 may receive this information and analyze this information to generate risk level indicators for the particular network elements which have been designated as requiring monitoring (act 610). It should be understood that network monitoring system 150 may be pre-programmed to periodically monitor particular network elements, such as critical network elements, at predetermined intervals. Network monitoring system 150 may then determine whether the generated risk level indicators indicate whether any of the network elements poses a particularly high risk (e.g., has a high score) or whether any anomalies have occurred in system 100 (e.g., a network element in currently under an attack).

Assume that network monitoring system 150 detects a high risk with respect to a particular network element or that the particular network element or an anomaly with respect to data destined for a particular network element (act 620). For example, assume that network monitoring system 150 detects an anomaly associated with traffic to server 112-1.

Network monitoring system 150 may then look at the risk level indicator associated with server 112-1 to determine whether remediation is required. For example, suppose that the anomaly is associated with traffic destined for an open transmission control protocol/Internet protocol (TCP/IP) port on server 112-1 having high vulnerability. The anomaly may be associated with the amount of traffic destined for this port (e.g., a particularly large amount of traffic), the type of traffic, etc. Network monitoring system 150 may also determine whether an exception for this type of traffic has been registered and stored in, for example, policy monitoring tools database 340. Network monitoring system 150 may then determine, based on for example, the score and other factors that remediation is required.

Network monitoring system 150 may then perform a remediation action (act 620). For example, network monitoring system 150 may send alerts to consoles of parties associated with the network element for which the anomaly is detected or send alerts to other user devices associated with parties responsible for monitoring the network element for which the anomaly is detected. For example, network monitoring system 150 may send an alert to any device that is capable of receiving messages, such as a pager, a PDA, a cell phone, etc. In still other alternatives, network monitoring system 150 may send an e-mail message to one or more parties associated with monitoring the network element for which the anomaly is detected. Network monitoring system 150 may also perform a quarantine action to isolate or limit access to the network element. In each case, network monitoring system 150 may identify the anomaly and take necessary actions to mitigate the risk to the network element. Network monitoring system 150 may also send details regarding the network element for which the anomaly is detected to an external knowledge base application for further analysis.

Further, as described above, if network monitoring system 150 detects an attack signature directed to a network element that is vulnerable to such an attack, an alert may be immediately sent to the appropriate console(s) indicating that an attack is in progress. In some implementations, network monitoring system 150 may automatically take steps to quarantine or protect the network element to which the attack is directed.

Network monitoring system 150 may also document actions taken (act 630). This essentially creates a remediation log that can be viewed at a later time by the appropriate parties.

CONCLUSION

Implementations consistent with the invention facilitate risk analysis with respect to network elements and networks. Implementations consistent with the invention also provide flexibility with respect to analyzing and remediating risk. For example, by using the risk level indicators generated for each network element, network personnel may set priorities with respect to reducing or eliminating risk associated with network elements most vulnerable to an attack. In addition, using relative risk level indicators may also eliminate or reduce the need for a human operator to look at every alert or anomaly associated with a network to determine whether action is required.

In this disclosure, there is shown and described preferred embodiments of the invention, but, as aforementioned, it is to be understood that the invention is capable of use in various other combinations and environments and is capable of changes or modifications within the scope of the inventive concept as expressed herein.

For example, in the exemplary description above, network monitoring system 150 interacts with scanner 130 and IDS 140 to receive information regarding various elements in system 100. In other implementations, other devices or additional devices may be used to generate risk assessment information. Further, in some implementations, network monitoring system 150 may include scanner(s), IDS(s) and other devices that aid in gathering information for use in generating risk analysis information.

Further, implementations of the invention have been described above as generating risk level indicators for various network elements. In some of the implementations described above, various point values were described as being assigned to various vulnerabilities and then these point values were added or subtracted to generate a risk level indicator. In other implementations, other operations may be used to transform various identified network conditions into an overall risk level indicator. For example, a mathematical function may be applied to the identified conditions to generate a score. In further alternatives, operations involving, for example, multiplication, division, polynomials, exponentiation, etc. may be used to transform the identified conditions into an overall risk level indicator. In other words, implementations of the invention are not limited to any particular mathematical function or formula used to transform identified network conditions into a risk level indicator. That is, any particular transformation associated with identified network conditions may be used, where the transformation is based on the knowledge of those most familiar with the network/network element for which the risk level indicator is being generated.

In addition, while series of acts have been described with respect to FIGS. 4-6, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit, a field programmable gate array or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of the invention is defined by the claims and their equivalents.

What is claimed is:

1. A method comprising:
   at a network monitoring system of a computer network that comprises a plurality of network elements, wherein the network monitoring system includes a hardware processing device, receiving a plurality of values that each corresponds to a vulnerability of a network element of the plurality of network elements;
   storing, at the network monitoring system, information representing exceptions to security rules;
   scanning, by a scanning device, the plurality of network elements to identify vulnerabilities, the vulnerabilities representing potential points of attack;
   generating, by said network monitoring system, a risk indicator for each of the network elements based on the scanning and the received plurality of values, the risk indicator representing a relative risk level associated with the corresponding network element;
   determining, by the network monitoring system and subsequent to the generating a risk indicator, whether an exception to a security rule exists with respect to any of the identified vulnerabilities;
   adjusting, by the network monitoring system, the risk indicator for a first one of the network elements in response to determining that an exception to a security rule exists with respect to an identified vulnerability associated with the first network element; and
   providing the risk indicator for each of the network elements to a user device for display.

2. The method of claim 1, further comprising:
   prioritizing risk associated with the plurality of network elements based on the risk indicators, where a network element that is currently under attack is assigned a highest priority.

3. The method of claim 1, further comprising:
   determining whether action is required with respect to a first one of the network elements based on the risk indicator associated with the first network element.

4. The method of claim 3, further comprising:
   automatically performing a remedial action with respect to the first network element upon determining that action is required.

5. The method of claim 4, where the remedial action comprises:
   quarantining or preventing access to the first network element.

6. The method of claim 4, further comprising:
   determining, after performing said remedial action, whether subsequent remedial action is required; and
   upon determining that subsequent remedial action is required, performing said subsequent remedial action.

7. The method of claim 1, where the risk indicator comprises a numerical score.

8. The method of claim 1, where said network monitoring system comprises one or more computing devices that perform said receiving, generating, and providing.

9. The method of claim 8, where each of the network elements comprises a computing device that is not a computing device of the network monitoring system.

10. The method of claim 1, where a particular vulnerability associated with a particular network element is at least one of:
    one or more open ports within the particular network element,
    an interface between the particular network element and one or more non-secured devices,
    a lack of an intrusion detection system on the particular network element,
    a lack of a firewall on the particular network element, or
    a lack of any protection system installed on the particular network element.

11. The method of claim 1, further comprising:
    identifying a plurality of vulnerabilities associated with a first one of the network elements; and
    identifying a score associated with each of said identified vulnerabilities;
    where generating a risk indicator for the first network element comprises adding the identified scores together.

12. A method comprising:
    providing, by a network monitoring system that includes a hardware processing device, an interface to a user device, the interface including options associated with monitoring network devices;
    receiving, by the network monitoring system, an input from the user device;
    identifying, by the network monitoring system, at least one network device in response to the input;
    generating, at the network monitoring system, a risk indicator associated with the at least one network device, the risk indicator representing a relative risk associated with the at least one network device, said risk indicator based on one or more vulnerabilities of the at least one network device, where generating the risk indicator comprises:
       signaling a scanner device to perform a scan of the at least one network device,
       receiving data from the scanner device, the data being associated with results of the scan of the at least one network device,
       identifying one or more vulnerabilities associated with the at least one network device based on the received data, and
       generating the risk indicator for the at least one network device based on values associated with the identified vulnerabilities;
    adjusting, by the network monitoring system and subsequent to generating the risk indicator, the risk indicator based on exceptions to security rules; and
    providing the adjusted risk indicator to the user device from the network monitoring system.

13. The method of claim 12, further comprising:
    receiving login information from the user device; and
    identifying access privileges based on the login information, where providing the interface comprises:
    providing options based on the identified access privileges, where the access privileges of a first user allow the first user to input options for a first plurality of network devices, where the access privileges of a different second user allow the second user to input options for a different second plurality of network devices.

14. The method of claim 12, further comprising:
    storing information representing exceptions to security rules associated with the at least one network device, where adjusting the risk indicator comprises:
    accessing the stored information to generate the adjusted risk indicator.

15. The method of claim 12, where generating the risk indicator further comprises:

generating at least one of a high, medium or low indicator or generating a letter grade.

16. The method of claim 12, further comprising:
monitoring the at least one network device to identify vulnerabilities with respect to potential points of attack, each of the identified vulnerabilities having an assigned value.

17. The method of claim 16, where the assigned values are based on at least one of a function associated with the at least one network device or a location of the at least one network device.

18. A system, comprising:
a memory to:
store values associated with a plurality of network-related vulnerabilities, and
store information representing exceptions to security rules; and
a processing device to:
receive information corresponding to one or more identified vulnerabilities associated with a particular network device,
access the memory to determine the values associated with the identified one or more vulnerabilities,
generate a risk level indicator for the particular network device based on the values associated with the identified vulnerabilities,
access the memory to determine whether an exception to a security rule exists with respect to any of the identified vulnerabilities associated with the particular network device, and
adjust the risk level indicator in response to determining that an exception exists.

19. The system of claim 18, where the processing device is further to:
forward the risk level indicator to a user device for display, and
forward the values associated with one or more of the identified vulnerabilities to the user device for display.

20. The system of claim 18, where the processing device is further to:
provide an interface to a user device, the interface including options associated with monitoring network devices,
receive an input from the user device,
identify at least one network element in response to the input,
generate a risk level indicator associated with the at least one network element, and
provide the risk level indicator to the user device.

21. The system of claim 20, where the processing device is further to:
identify access privileges associated with the user device based on login information provided by the user device, and
upon providing said interface, provide options based on the identified access privileges.

22. The system of claim 18, where the processing device is further to:
scan a first network device to identify whether any open ports exist on the first network device.

23. A system comprising:
means for storing values associated with each of a plurality of vulnerabilities;
means for scanning a network element to identify vulnerabilities, the vulnerabilities representing potential points of attack;
means for identifying at least one of the plurality of vulnerabilities associated with the network element based on output from the means for scanning;
means for generating a risk indicator for the network element based on the stored value associated with the at least one identified vulnerability; means for adjusting the risk indicator, subsequent to generating the risk indicator, based on exceptions to security rules stored in the system; and
means for outputting the adjusted risk indicator.

* * * * *